(12) United States Patent
Hotate et al.

(10) Patent No.: US 9,784,643 B2
(45) Date of Patent: Oct. 10, 2017

(54) OPTICAL FIBER PROPERTY MEASURING DEVICE AND OPTICAL FIBER PROPERTY MEASURING METHOD

(71) Applicant: The University of Tokyo, Tokyo (JP)

(72) Inventors: Kazuo Hotate, Tokyo (JP); Rodrigo K. Yamashita, Tokyo (JP); Zuyuan He, Tokyo (JP)

(73) Assignee: The University of Tokyo, Tokyo (JP)

( * ) Notice: Subject to any disclaimer, the term of this patent is extended or adjusted under 35 U.S.C. 154(b) by 47 days.

(21) Appl. No.: 14/632,794

(22) PCT Filed: Aug. 27, 2013

(86) PCT No.: PCT/JP2013/072811
§ 371 (c)(1),
(2) Date: Feb. 26, 2015

(87) PCT Pub. No.: WO2014/034638
PCT Pub. Date: Mar. 6, 2014

(65) Prior Publication Data
US 2016/0273999 A1    Sep. 22, 2016

(30) Foreign Application Priority Data
Aug. 27, 2012    (JP) ................................ 2012-187003

(51) Int. Cl.
*G01M 11/00* (2006.01)
*G01D 5/353* (2006.01)

(52) U.S. Cl.
CPC ..... *G01M 11/3181* (2013.01); *G01D 5/35364* (2013.01); *G01M 11/39* (2013.01)

(58) Field of Classification Search
CPC .......................... G01M 11/3181; G01M 11/39
See application file for complete search history.

(56) References Cited

U.S. PATENT DOCUMENTS

2010/0225900 A1* 9/2010 Hotate ............... G01M 11/3181
                                                          356/73.1

FOREIGN PATENT DOCUMENTS

JP    2000180265 A    6/2000
JP    2007178346 A    7/2007
            (Continued)

OTHER PUBLICATIONS

Yamashita, Rodrigo Kendy, et al. "Measurement range elongation based on temporal gating in Brillouin optical correlation domain distributed simultaneous sensing of strain and temperature." IEEE Photonics Technology Letters 24.12 (2012): 1006-1008.*

(Continued)

*Primary Examiner* — Shawn Decenzo
(74) *Attorney, Agent, or Firm* — Fox Rothschild LLP; Robert J. Sacco; Carol E. Thorstad-Forsyth

(57) ABSTRACT

There are proposed an optical fiber property measuring device and an optical fiber property measuring method which can enhance spatial resolution more than before. In the present invention, in synchronization with frequency modulation applied to x-polarized light, intensity modulation is also applied to the x-polarized light by an intensity modulation means. This makes it possible to increase or decrease the intensity of the x-polarized light at a specific frequency, thereby allowing the effective length of a Brillouin dynamic grating formed by the x-polarized light to be adjusted. As a result, the shape of the reflection spectrum obtained when y-polarized light is reflecting by the Brillouin dynamic grating can also be adjusted optimally, which leads to enhancement of spatial resolution with the y-polarized light.

6 Claims, 10 Drawing Sheets

(56) References Cited

FOREIGN PATENT DOCUMENTS

| JP | 2008286697 A | 11/2008 |
| JP | 2009236813 A | 10/2009 |
| JP | 4761258 B2 | 8/2011 |
| WO | 2004/040241 A1 | 5/2004 |
| WO | 2009/115501 A1 | 9/2009 |
| WO | 2012/148661 A1 | 11/2012 |

OTHER PUBLICATIONS

Zou, Weiwen et al., Demonstration of Brillouin Distributed Discrimination of Strain and Temperature Using a Polization-Maintaining Optical Fiber, IEEE Photonics Technology Letters, vol. 22, No. 8, Apr. 15, 2010.

* cited by examiner

INTENSITY NOT MODULATED

INTENSITY MODULATED

OPTICAL FIBER PROPERTY MEASURING DEVICE AND OPTICAL FIBER PROPERTY MEASURING METHOD

TECHNICAL FIELD

The present invention relates to an optical fiber property measuring device and an optical fiber property measuring method. The present invention more particularly relates to an optical fiber property measuring device and an optical fiber property measuring method for sensing distribution of strain and temperature applied to a polarization maintaining-type optical fiber under test as a measurement target by using a stimulated Brillouin scattering phenomenon and a Brillouin dynamic grating phenomenon generated in this optical fiber under test.

BACKGROUND ART

Brillouin scattering in an optical fiber is changed depending on a strain applied to the optical fiber. There has conventionally been devised a technique for measuring distributed strain along the optical fiber by using this phenomenon. This measuring technique enables the level of strain to be measured by measurement of a frequency change in Brillouin scattered light, and also enables distorted part of the optical fiber to be identified by measurement of the time until the Brillouin scattered light returns. Accordingly, when optical fibers are wired in all directions on the constructions such as bridges and bridge piers, buildings, and dams, and/or on the materials such as wings and fuel tanks of an airplane, the distribution of strain applied to these constructions and/or materials can be revealed. Based on such distribution of strain, deterioration and/or secular change in materials and structures are revealed. Accordingly, this measurement technique is attracting attention as a technique useful for disaster and/or accident prevention (see, for example, Patent Literatures 1 and 2).

A description is now given of the principle of the Brillouin scattering. When light is incident on a general optical fiber, glass molecules in the material of the optical fiber thermally oscillate and generate ultrasonic waves, which include an ultrasonic wave having a wavelength half the wavelength of the incident light. Periodic change in a refractive index of the glass caused by the ultrasonic wave function as a Bragg diffraction grating for the incident light, and reflects the light backward. This is how the Brillouin scattering phenomenon works. While the reflected light is Doppler-shifted depending on the velocity of the ultrasonic wave, the amount of frequency shift varies depending on expansion and contraction strain applied to the optical fiber. Accordingly, the strain can be detected by measuring the shift amount.

As a typical technique to measure the distribution of such Brillouin scattering along a length direction of the optical fiber, a Brillouin optical correlation domain analysis (BOCDA) method is known as disclosed in Patent Literature 1 and the like.

However, the Brillouin scattering in the optical fiber depends not only on strain but also on temperature. At measurement sites where temperature changes, precise measurement is not available. Accordingly, in order to solve such a problem, an optical fiber property measuring device has been proposed which applies the above-stated BOCDA method to an optical fiber under test having a polarization retention property and which also measures a spectrum of reflected light generated by the Brillouin dynamic grating which is a phenomenon relevant to the Brillouin scattering at the same time, so that both variation of the temperature and the strain can precisely be measured based on the result of these two measurements (see, for example, Non Patent Literature 1).

CITATION LIST

Patent Literature

Patent Literature 1: Japanese Patent No. 3667132
Patent Literature 2: Japanese Patent No. 4761258

Non Patent Literature

Non Patent Literature 1: "Demonstration of Brillouin Distributed Discrimination of Strain and Temperature Using a Polarization-Maintaining Optical Fiber", Weiwen Zou, Member, IEEE, Zuyuan He, Member, IEEE, and Kazuo Hotate, Fellow, IEEE, IEEE PHOTONICS TECHNOLOGY LETTERS, VOL. 22, NO. 8, Apr. 15, 2010

SUMMARY OF INVENTION

Technical Problem

In the conventional optical fiber property measuring device having such configuration, the amount of change in the temperature and strain can precisely be measured based on the measurement results, respectively. However, there is a problem that it has a limited spatial resolution, which is not sufficient for diagnosing the distribution of strain and the distribution of temperature applied to the constructions and/or the materials.

Moreover, to measure a birefringence itself of an optical fiber with the Brillouin dynamic grating, the above-stated conventional optical fiber property measuring device has limited spatial resolution, which causes a problem of insufficient spatial resolution.

Accordingly, the present invention has been made in consideration of the above-stated points, and an object of the present invention is to propose an optical fiber property measuring device and an optical fiber property measuring method which may enhance spatial resolution more than before.

Solution to Problem

In order to solve the above-stated problem, first and seventh aspects of the present invention includes: shifting a frequency of frequency-modulated first polarized light and making the light enter from one end of an optical fiber under test as probe light, the optical fiber under test having a polarization retention property; making the first polarized light enter from the other end of the optical fiber under test as pump light; making frequency-modulated second polarized light enter from the other end of the optical fiber under test as readout light; measurement means for detecting a reflection spectrum of the readout light and measuring a property of the optical fiber under test, the readout light being reflected by a Brillouin dynamic grating formed by the pump light and the probe light inside the optical fiber under test; and applying intensity modulation to the first polarized light by intensity modulation means in synchronization with frequency modulation applied to the first polarized light.

Advantageous Effects of Invention

According to the present invention, in synchronization with frequency modulation applied to the first polarized light, intensity modulation is also applied by the intensity modulation means. This makes it possible to increase or decrease the intensity of the first polarized light at a specific frequency, thereby allowing the effective length of a Brillouin dynamic grating formed by the first polarized light to be adjusted. As a result, the shape of the reflection spectrum obtained when the light is reflecting by the Brillouin dynamic grating can also be adjusted optimally, which leads to enhancement of spatial resolution.

DESCRIPTION OF EMBODIMENTS

Hereinafter, embodiments of the present invention will be described in detail with reference to the drawings.

Figure 1:
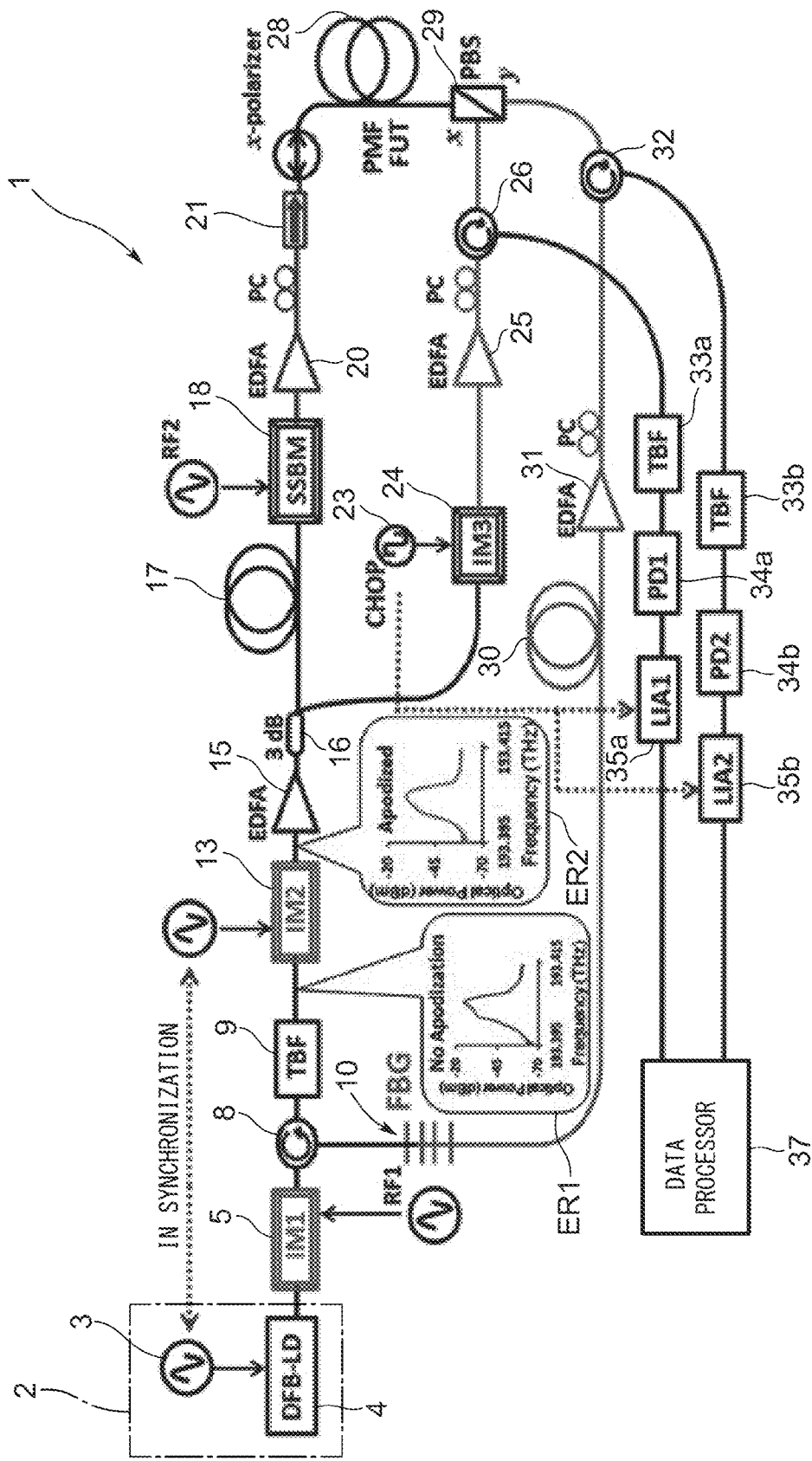
FIG. 1 is a block diagram illustrating the configuration of an optical fiber property measuring device in a first embodiment of the present invention.

FIG. 1 illustrates an optical fiber property measuring device 1 according to a first embodiment of the present invention, which includes an optical fiber under test 28 constituted of a polarization maintaining fiber (PMF). Here, reference numeral 2 designates a light source constituted of a signal generator 3 and a semiconductor laser 4. As the semiconductor laser 4, a small-size distributed feedback laser diode (DFB-LD) is used which emits laser light of a narrow spectral bandwidth, for example. The signal generator 3 outputs a desired modulation signal into the semiconductor laser 4 as an injection current in order to repeatedly perform frequency modulation (including phase modulation) of continuous laser light emitted from the semiconductor laser 4 in a sinusoidal shape.

Reference numeral 5 designates an optical intensity modulator (IM1) that modulates the intensity of light output from the semiconductor laser 4 to generate, for example, laser light having a frequency component of ±two dozen [GHz] added thereto. The optical intensity modulator 5 outputs the intensity-modulated laser light to a wavelength selection reflector 10 via an optical branch device 8. The wavelength selection reflector 10 is a fiber Bragg grating (FBG) in which a periodic change is formed in the refractive index of an optical fiber core. The wavelength selection reflector 10 may reflect only the laser light of a negative-side frequency component, which is formed by a periodic refractive index change and which satisfies Bragg reflection condition, as x-polarized light, and send out the x-polarized light to a probe light/pump light generating optical path. Contrary to this, the wavelength selection reflector 10 may pass only the laser light of a positive-side frequency component as y-polarized light, and send out the y-polarized light to a readout light generating optical path.

The x-polarized light as first polarized light and the y-polarized light as second polarized light herein refer to two linearly polarized light components which oscillate in right angle direction with each other (x-axis direction and y-axis direction) inside a plane vertical to a light travel direction. Reference numeral 9 designates a tuneable bandpass filter (TBF) provided in the probe light/pump light generating optical path. The tuneable bandpass filter (TBF) 9 may remove excessive light components so that only the x-polarized light reflected from the wavelength selection reflector 10 may enter into a subsequent optical intensity modulator (IM2) 13.

Reference numeral 13 designates an optical intensity modulator (IM2) used as an intensity modulation means for modulating the intensity of the x-polarized light reflected by the wavelength selection reflector 10 in synchronization with the frequency modulation applied to the semiconductor laser 4. The optical intensity modulator 13 herein has a function of being able to modulate the intensity of the x-polarized light input from the semiconductor laser 4 via the wavelength selection reflector 10 upon reception of a sync signal from the signal generator 3 that is equivalent to an input signal. Specifically, the optical intensity modulator 13 is implemented by an electrooptical modulator (EOM). One of the characteristic configurations of the present embodiment is the optical intensity modulator 13 added to the optical fiber property measuring device using the BOCDA method, the optical intensity modulator 13 applying intensity adjustment to the x-polarized light. Another configuration of the intensity modulation means will be described later.

In the probe light/pump light generating optical path, the x-polarized light whose frequency and intensity are both modulated by the optical intensity modulator 13 is amplified by an erbium-doped optical fiber amplifier (hereinafter referred to as EDFA) 15. The x-polarized light is then branched by an optical branch device 16 into two parts in an intensity ratio of 50 to 50, for example. Out of two branched parts, one x-polarized light passes an optical delay device 17, and the frequency thereof is lowered by about 11 [GHz]

by a single-sideband modulator (SSBM) (hereinafter referred to as a SSB modulator) 18. This light is used as x-probe light, which is made to enter into one end of an optical fiber under test 28 having a polarization retention property (hereinafter referred to as a polarization maintaining fiber-type optical fiber under test (PMF FUT)). The optical delay device 17 is configured to set specified delay time between x-probe light and x-pump light (described later). The delay time can properly be adjusted by changing the optical fiber length.

The SSB modulator 18 uses a microwave and precise DC bias control so that out of two primary sideband waves, a higher frequency component can be suppressed while maintaining a stable frequency difference Δν which is a difference in frequency from x-pump light. A lower frequency sideband wave different in frequency by Δν from the input light is output as x-probe light. The lower frequency sideband wave is equal to a microwave frequency.

Figure 2A:
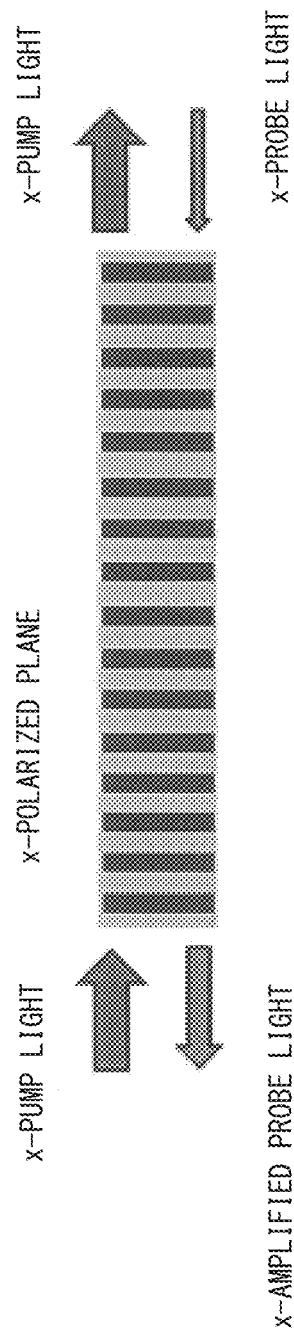
FIG. 2 are schematic views illustrating x-pump light, x-probe light, and y-readout light entering to a polarization maintaining fiber-type optical fiber under test and amplified x-probe light and y-reflected light exiting from the polarization maintaining fiber-type optical fiber under test.

The other x-polarized light beam branched by the optical branch device 16 is intensity-modified by an optical intensity modulator 24 having a reference signal generator 23, and then is amplified by an EDFA 25. Then, the x-polarized intensity-modulated light which is amplified in the EDFA 25 passes an optical branch device 26 and a polarization beam splitter (PBS) 29, and enters from the other end of the PMF FUT 28 as x-pump light. As illustrated in FIG. 2A, the x-probe light and the x-pump light propagate facing each other inside the polarization maintaining fiber-type optical fiber under test 28.

As a result, x-polarized light exiting from the other end of the polarization maintaining fiber-type optical fiber under test 28 is obtained. As illustrated in FIG. 1, the x-polarized light is captured into a photodetector (PD1) 34a via the polarization beam splitter 29, the optical branch device 26, and a tuneable bandpass filter (TBF) 33a, and the power thereof is measured in the photodetector 34a. The detected output from the photodetector 34a passes a lock in amplifier 35a, where synchronous detection of the output is performed at the modulation frequency of the x-pump light. Accordingly, a Brillouin gain of the probe light relating to a guidance Brillouin phenomenon is captured into a data processor 37 as final data at a specified sampling rate. The data processor 37 serves as a Brillouin gain measurement means constituted of a personal computer, for example.

In FIG. 1, part of x-pump light subjected to reflection and backscattering is also made to exit from the polarization maintaining fiber-type optical fiber under test 28. In order to remove such part of the x-pump light, the tuneable bandpass filter 33a is provided prior to the photodetector 34a.

Figure 2B:
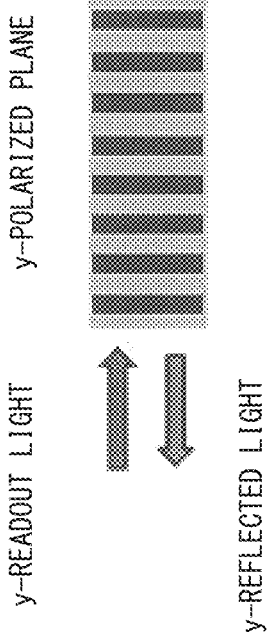

In addition, the y-polarized light which passed the wavelength selection reflector 10 passes the optical delay device 30, and is amplified by an EDFA 31. The y-polarized light amplified by this EDFA 31 passes an optical branch device 32 and the polarization beam splitter 29, and then enters as y-readout light from the other end of the polarization maintaining fiber-type optical fiber under test 28. In this case, as illustrated in FIG. 2B, the x-probe light and the x-pump light propagate facing each other under optimum conditions so that sound waves are formed inside the polarization maintaining fiber-type optical fiber under test 28. In the present invention, a periodic refractive index structure formed by such sound waves is referred to as a Brillouin dynamic grating, in which the sound waves excited by the x-probe light and the x-pump light that are incident on an x-polarized plane reflects y-readout light incident on a y-polarized plane, so that y-reflected light exiting from the other end of the polarization maintaining fiber-type optical fiber under test 28 may be generated.

As illustrated in FIG. 1, the y-polarized light exiting from the other end of the polarization maintaining fiber-type optical fiber under test 28 is captured into a photodetector (PD 2) 34b via the polarization beam splitter 29, the optical branch device 32, and a tuneable bandpass filter (TBF) 33b, and a reflection spectrum (also referred to as a Brillouin dynamic grating spectrum) thereof is measured in the photodetector 34b. The detected output from the photodetector 34b passes a lock in amplifier 35b, where synchronous detection of the output is performed at the modulated frequency of the pump light. Accordingly, the reflection spectrum of the y-reflected light relating to a Brillouin dynamic grating phenomenon is captured into the data processor 37 serving as a measurement means as final data at a specified sampling rate. In FIG. 1, in order to remove light other than the y-reflected light, the tuneable bandpass filter 33b is provided prior to the photodetector 34b.

The optical intensity modulator 24 provided inside the optical path for the x-pump light is constituted of, for example, an electrooptical modulator like the optical intensity modulator 13. As the optical branch devices 8, 26, and 32, circulators, beam splitters, half mirrors and the like may be used. In still another modification, the light source 2 as a light source unit may emit output light independently for each of the x-probe light and x-pump light, and the y-readout light. For example, when separate light sources are provided, the light sources each include an optical intensity modulator 5 that synchronizes with frequency modulation of each of the light sources.

In the present embodiment, the optical delay device 17, the SSB modulator 18, the EDFA 20, and the isolator 21 constitute a probe light generation means for generating x-probe light from the output light of the light source 2. The optical intensity modulator 24, the EDFA 25, and the optical branch device 26 constitute a pump light generation means for generating x-pump light from the output light of the light source 2. The wavelength selection reflector 10, the optical delay device 30, the EDFA 31, and the optical branch device 32 constitute a readout light generation means for generating y-readout light from the output light of the light source 2.

In the present embodiment, the tuneable bandpass filter 33a, the photodetector 34a, the lock in amplifier 35a, and the data processor 37 detect a Brillouin gain of the x-probe light exiting from the other end of the polarization maintaining fiber-type optical fiber under test 28 while sweeping a frequency difference between the x-pump light and the x-probe light. Separately from this detection, the tuneable bandpass filter 33b, the photodetector 34b, the lock in amplifier 35b, and the data processor 37 detect a reflection spectrum of y-reflected light exiting from the other end of the polarization maintaining fiber-type optical fiber under test 28.

In the present embodiment, the Brillouin gain of the x-probe light exiting from the other end of the polarization maintaining fiber-type optical fiber under test 28 and the reflection spectrum of the y-reflected light exiting from the other end of the polarization maintaining fiber-type optical fiber under test 28 each independently depend on temperature and strain. Therefore, a change in temperature and strain can precisely be calculated based on these two measurement results.

Since the technique to calculate such two physical values each having different dependence on temperature and strain based on such measurement results is disclosed in detail in Non Patent Literature 1 mentioned in the prior art, the description thereof is omitted herein.

The optical fiber property measuring device 1 according to the present invention also conforms to the basic principle of the BOCDA method. That is, the light source 2 emits continuous oscillation light, the oscillation frequency of which is changed with a sinusoidal repetitive waveform by the signal generator 3, while the SSB modulator 18 changes a center frequency $f_{probe}$ of x-probe light so that a difference between the center frequency $f_{probe}$ of the x-probe light and the center frequency $f_{pump}$ of x-pump light approximates a Brillouin frequency $v_B$. At almost all the positions, frequency modulation of the x-pump light and the x-probe light is asynchronous and stimulation is suppressed. However, at a correlative position where the frequency modulation of the x-pump light and the x-probe light is in synchronization, stimulated Brillouin scattering occurs. By moving this correlative position, it becomes possible to measure distribution of strain and temperature with the stimulated Brillouin scattering.

When the stimulated Brillouin scattering occurs, the sound waves of a wavelength about half the wavelength of incident light excites relatively strongly inside the polarization maintaining fiber-type optical fiber under test 28, and the sound waves form a Brillouin dynamic grating inside the polarization maintaining fiber-type optical fiber under test 28. The Brillouin dynamic grating formed by the x-polarized light (periodic structure of refractive index formed by sound waves) functions as a diffraction grating also for y-polarized light orthogonal to the x-polarized light. More specifically, in the polarization maintaining fiber-type optical fiber under test 28, when y-readout light, which is y-polarized light orthogonal to x-polarized light, is incident while a frequency difference between the x-pump light and the x-probe light is maintained to be a Brillouin frequency shift, y-reflected light with a reflection spectrum (Brillouin dynamic grating spectrum) having a peak at a specific frequency can be observed.

Here, the present invention is characteristic in the following point. That is, x-polarized light involving generation of x-pump light and x-probe light is subjected to intensity modulation performed by the optical intensity modulator 13 in synchronization with the frequency modulation of the light source 2. Accordingly, the spectrum of the x-polarized light is changed and thereby the effective length of the Brillouin dynamic grating is shortened, so that the spatial resolution for acquiring the spectrum of y-reflected light can be enhanced.

In this connection, since modulation applied to the x-probe light and the y-pump light is periodic, the correlative position by the stimulated Brillouin scattering periodically appears along the polarization maintaining fiber-type optical fiber under test 28 interposed in between the isolator 21 and the polarization beam splitter 29. Accordingly, the delay amount of the optical delay device 17 and the frequency modulation frequency $f_m$ applied to the semiconductor laser 4 are adjusted so that only one correlation peak is locationally present in the polarization maintaining fiber-type optical fiber under test 28. Furthermore, in order to expand the measuring range of the x-polarized light while maintaining high spatial resolution $\Delta z$ with the x-polarized light, it is necessary to increase amplitude $\Delta f$ of frequency modulation applied to the semiconductor laser 4, within the range where the spectrums of the x-probe light and the x-pump light do not overlap.

Next, the operation of the device illustrated in FIG. 1 will be described. When laser light that is frequency-modulated by an injection current from the signal generator 3 is emitted from the semiconductor laser 4, the laser light is reflected as x-polarized light which turns into x-pump light and x-probe light by the wavelength selection reflector 10. In response to a sync signal output from the signal generator 3 to the optical intensity modulator 13, the x-polarized light is intensity-modulated in synchronization with the frequency modulation in the optical intensity modulator 13.

The x-polarized light whose frequency and intensity are both modulated is branched at a specified intensity ratio in the optical branch device 16, and one light is input into the SSB modulator 18. The SSB modulator 18 performs SSB modulation of the modulated x-polarized light, and generates a sideband wave having a frequency difference $\Delta v$ (about 11 GHz) which is different from the center frequency of the modulated light and is close to Brillouin frequency $v_B$. The sideband wave passes the EDFA 20 and the isolator 21, and is made to enter into one end of the polarization maintaining fiber-type optical fiber under test 28 as x-probe light.

Meanwhile, the other modulated x-polarized light branched from the optical branch device 16 is input into the optical intensity modulator 24, where the intensity thereof is modulated based on the frequency of a reference signal generated from the reference signal generator 23. The modulated x-polarized wave chopped by the intensity modulation is amplified in the subsequent EDFA 25, and passes the optical branch device 26 and the polarization beam splitter 29 before entering into the other end of the polarization maintaining fiber-type optical fiber under test 28 as x-pump light.

In this way, the x-probe light and the x-pump light propagate in directions opposite from each other in the polarization maintaining fiber-type optical fiber under test 28. Consequently, part of x-pump light subjected to reflection and backscattering is made to exit from the polarization maintaining fiber-type optical fiber under test 28. At the same time, part of the x-probe light increased by stimulated Brillouin scattering is superimposed on the continuous x-probe light and is made to exit from the polarization maintaining fiber-type optical fiber under test 28. These exiting light beams are detected by the photodetector 34a, and synchronous detection is performed at the intensity modulation frequency of the x-pump light by the lock in amplifier 35a. As a result, only the increased part of the x-probe light generated in synchronization with chopping of the x-pump light is extracted and is amplified before being output, while frequency components other than the increased part are removed.

Upon reception of an output signal from the lock in amplifier 35a, the data processor 37 determines in which frequency the peak of the stimulated Brillouin scattering spectrum is present at the correlation peak position.

In addition, the y-polarized light which passed the wavelength selection reflector 10 at this time passes the optical delay device 30, the EDFA 31, the optical branch device 32, and the polarization beam splitter 29, and enters into the other end of the polarization maintaining fiber-type optical fiber under test 28 as y-readout light. In this way, when y-readout light enters into the polarization maintaining fiber-type optical fiber under test 28 during occurrence of the stimulated Brillouin scattering, the y-readout light is reflected by the Brillouin dynamic grating formed by the stimulated Brillouin scattering, and is made to exit from the other end of the polarization maintaining fiber-type optical fiber under test 28 as y-reflected light. When the exiting light is detected by the photodetector 34b and then is subjected to synchronous detection at the intensity modulation frequency of the x-pump light by the lock in amplifier 35b, only the increased part of the y-reflected light generated in synchronization with chopping of the x-pump light is extracted and is amplified before being input, while frequency components other than the increased part is removed.

Upon reception of an output signal from the lock in amplifier 35b, the data processor 37 determines in which frequency the peak of the Brillouin dynamic grating spectrum is present, and calculates a difference (a peak shift amount) fxy between the peak frequency of the Brillouin dynamic grating spectrum and the original frequency of the light source 2. Finally, the data processor 37 obtains the result of measuring distribution of temperature and strain in the polarization maintaining fiber-type optical fiber under test 28 based on the peak shift amount of the stimulated Brillouin scattering spectrum and the peak shift amount fxy of the Brillouin dynamic grating spectrum (see Non Patent Literature 1).

Here, the intensity of the Brillouin scattering that occurs at a certain position is expressed by the beat power spectrum of the x-pump light and the x-probe light. In the BOCDA method, appropriate frequency modulation is applied to x-pump light and x-probe light so that the beat power spectrum indicates a correlation peak at a specific position, where a stimulated Brillouin phenomenon is locally generated. The position of the correlation peak is shifted by changing a modulation parameter, and thereby distribution measurement is performed.

Spatial resolution at the time of acquiring a Brillouin gain spectrum (BGS) using the BOCDA method has theoretically and experimentally been confirmed. The resolution as high as 1.6 mm is implemented. However, it was experimentally indicated that the spatial resolution at the time of acquiring the Brillouin dynamic grating (BDG) spectrum with y-readout light did not match with the theoretical spatial resolution of a Brillouin gain spectrum and that the spatial resolution was lower than the theoretical spatial resolution. A simulation was conducted to find out the reason thereof. As a result, it was theoretically found out that the Brillouin dynamic grating spread to the region wider than the region of the spatial resolution for acquiring the Brillouin gain spectrum.

Figure 3A:
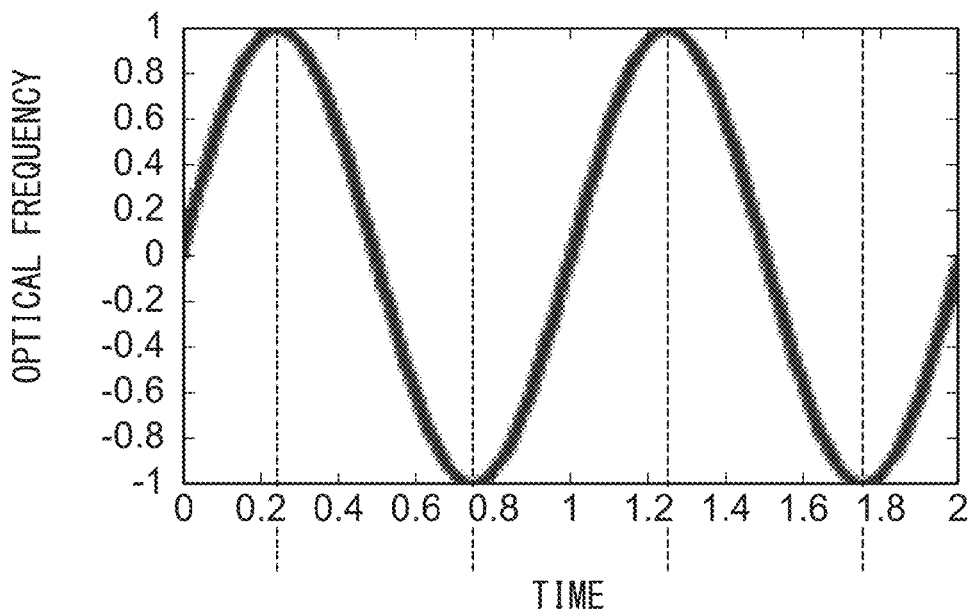
FIG. 3 is a graph view illustrating time change in optical frequency when frequency modulation is applied to output light with a sinusoidal repetitive waveform, and optical transmittance of an optical intensity modulator corresponding to the output light.
Figure 4A:
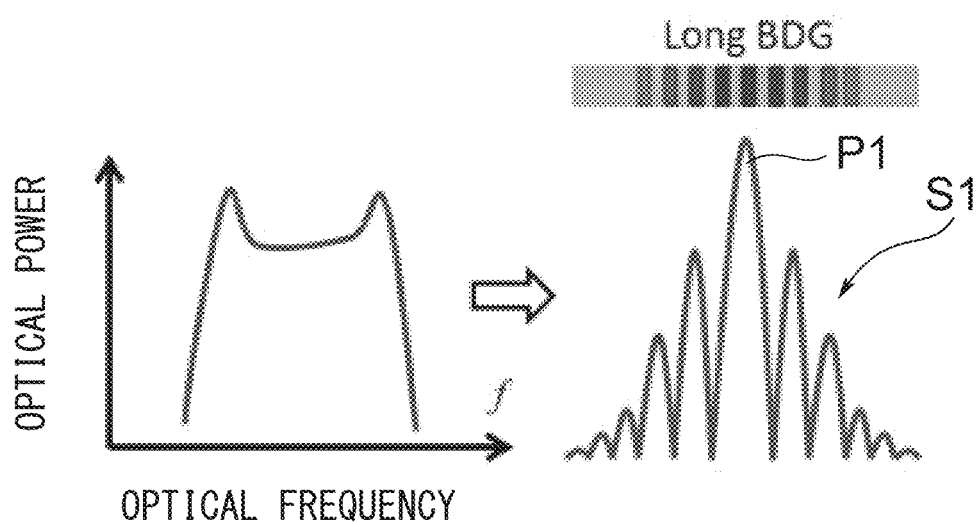
FIG. 4 are graph views and schematic views in the conventional case where intensity modulation is not performed and the case where intensity modulation is performed, the graph views illustrating distribution of a time average spectrum and a Brillouin gain in a longitudinal direction of an optical fiber (distribution of a beat power spectrum in the longitudinal direction of the optical fiber), and the schematic views illustrating the length of a Brillouin dynamic grating.

This finding is described with reference to FIGS. 3A and 4A. FIG. 3A is a time change in the optical frequency of modulated light obtained from the light source 2. The optical frequency is modulated into a sinusoidal shape. In this case, since the frequency is formed into a sinusoidal shape, the waveform stays in a maximum displacement portion made up of a peak part and a valley part of the frequency for relatively long time. Accordingly, a time average power spectrum intensity of the frequency corresponding to that portion becomes higher. A left side graph in FIG. 4A is a schematic view illustrating such a waveform illustrated in FIG. 3A as a time average spectrum. As described above, the time average power spectrum intensity of the frequency corresponding to the peak part and the valley part of the frequency is higher, and a shoulder portion on both sides of the peak part rises high.

The beat power spectrum formed from the x-pump light and the x-probe light based on x-polarized light having such a time average power spectrum includes, as illustrated in a right graph view of FIG. 4A, relatively high side lobes S1 formed on both sides of a main peak P1 in the length direction of an optical fiber. The Brillouin dynamic grating (BDG) formed by such a beat power spectrum spreads in a region wider than the spatial resolution for acquiring the Brillouin gain spectrum (BGS) (expressed by "Long BDG" in FIG. 4A). As a result, the spatial resolution for acquiring the Brillouin dynamic grating of the y-reflected light obtained based on the Brillouin dynamic grating is lowered.

Figure 4B:
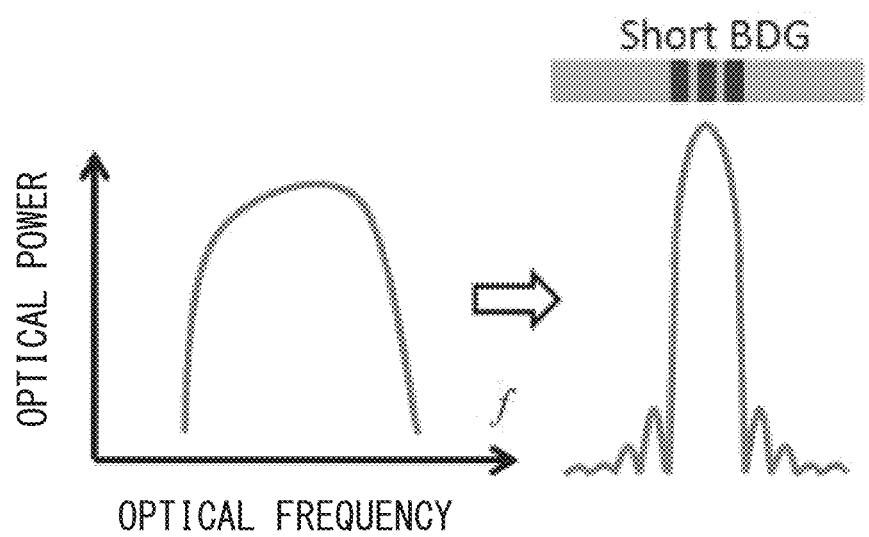

Accordingly in the present invention, as illustrated in the left graph view in FIG. 4B, intensity modulation is applied to the x-polarized light by the optical intensity modulator 13, so that the shoulder portion having a high time average power spectrum intensity is adjusted to have an intensity characteristic of a smooth protrusion and the time average power spectrum intensity on both the sides of the peak is suppressed. Accordingly, in the present invention, as illustrated in the right graph view in FIG. 4B, the side lobe S1 (FIG. 4A) in a coherence function representing the beat power spectrum can be suppressed. As a result, the Brillouin dynamic grating generated at positions other than the correlation peak can be suppressed, so that the effective length of a Brillouin dynamic grating can be shortened (indicated by "Short BDG" in FIG. 4B), and the spatial resolution for acquiring the Brillouin dynamic grating spectrum of the y-reflected light obtained based on the Brillouin dynamic grating can be enhanced.

Figure 5A:
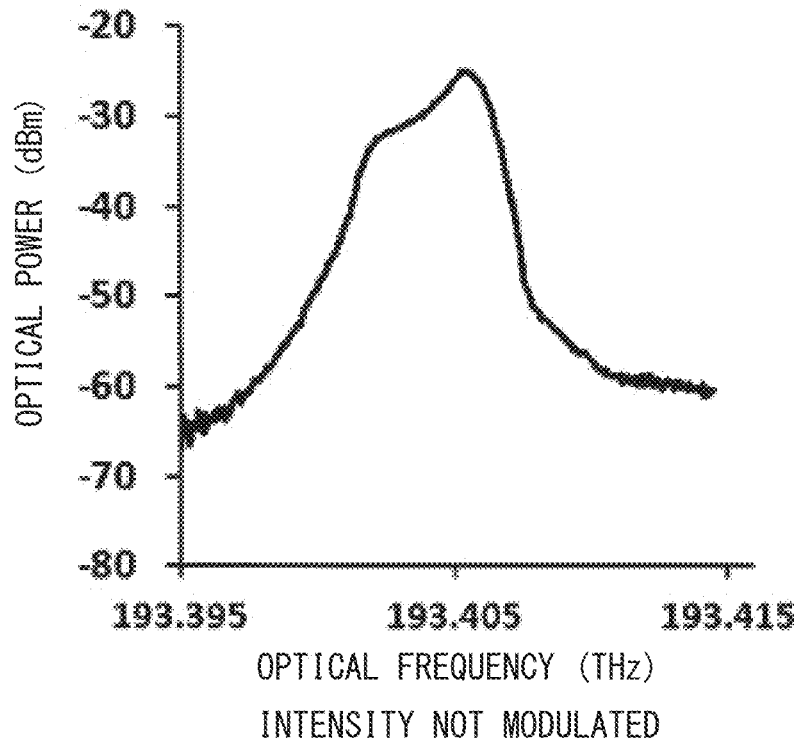
FIG. 5 are graph views illustrating time average spectrums before and after intensity modulation in the optical fiber property measuring device illustrated in FIG. 1.

In FIG. 4A, the graph view is schematically illustrated to plainly explain that the direct frequency modulation in the light source 2 with a sinusoidal shape causes the time average power spectrum intensity to concentrate on the shoulder portion on both the sides of the peak. However, in this optical fiber property measuring device 1, the waveform as illustrated in area ER1 of FIG. 1 is obtained. In this case, as illustrated in an enlarged view of the area ER1 in FIG. 5A, the shoulder portion on both the side of the peak does not rise high but has a swelled shape as if there is a corner portion.

Figure 5B:
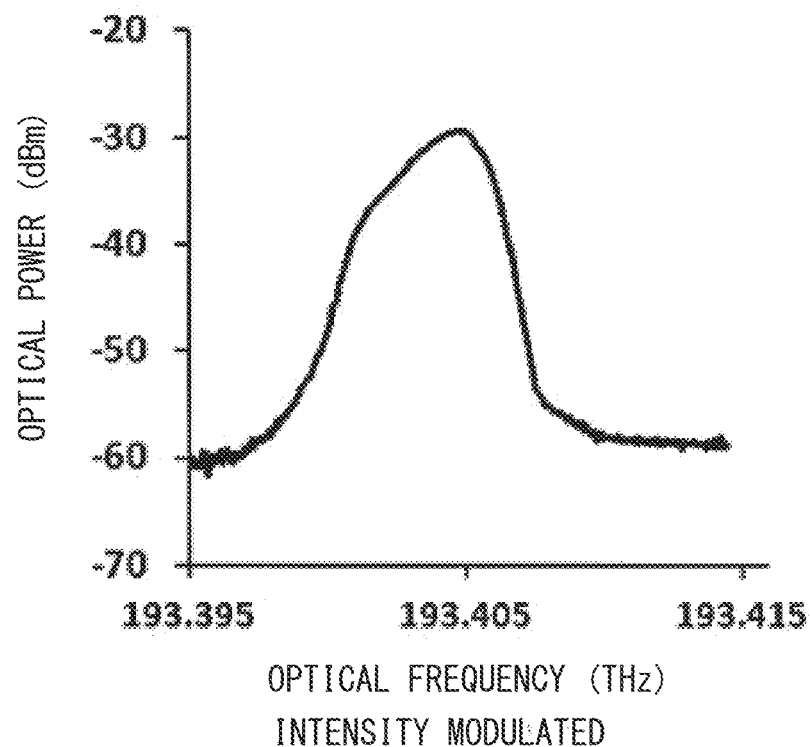

The optical intensity modulator 13 not only applies frequency modulation to the x-polarized light having such a time average spectrum but also applies intensity modulation in synchronization with this frequency modulation. As a result, as illustrated in FIG. 5B depicting an enlarged view of an area ER2 in FIG. 1, the time average power spectrum intensity of the shoulder portion on both the sides of the peak is suppressed to be smooth. By applying such intensity modulation to the x-polarized light, the effective length of the Brillouin dynamic grating formed in the polarization maintaining fiber-type optical fiber under test 28 can be shortened, and the spatial resolution for acquiring the spectrum of the y-reflected light obtained based on the Brillouin dynamic grating can be enhanced.

Figure 3B:
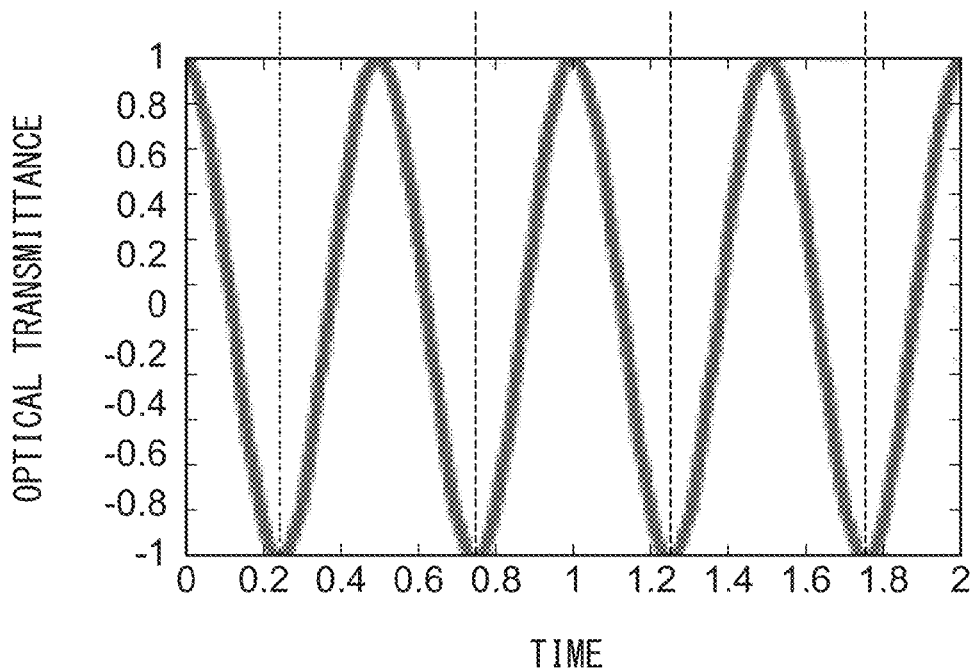

Here, FIG. 3B illustrates a waveform representing optical transmittance in the optical intensity modulator 13. The optical intensity modulator 13 applies intensity modulation to the modulated light illustrated in FIG. 3A, in which a minimum transmittance in the optical transmittance illustrated in FIG. 3B is aligned with the maximum displacement portion made up of the peak part and the valley part of the frequency, so that a time average spectrum as illustrated in FIG. 5B can be generated. As a result, in the optical fiber property measuring device 1, the side lobe S1 (FIG. 3B) in the beat power spectrum can be suppressed. As a result, the effective length of a Brillouin dynamic grating can be shortened, and the spatial resolution for acquiring a Brillouin dynamic grating spectrum of y-reflected light obtained based on the Brillouin dynamic grating can be enhanced.

As described in the foregoing, in the present invention, in synchronization with frequency modulation applied to x-polarized light, intensity modulation is also applied to the x-polarized light by the optical intensity modulator 13. This makes it possible to increase or decrease the intensity of the x-polarized light at a specific frequency, thereby allowing the effective length of a Brillouin dynamic grating formed by the x-polarized light to be adjusted. As a result, the shape of the reflection spectrum obtained when y-polarized light is reflecting by the Brillouin dynamic grating can also be adjusted optimally, which can achieve enhancement of spatial resolution with the y-polarized light.

In the frequency of output light as illustrated in FIG. 3A, the intensity of the light is made closer to a maximum value as the frequency approximates to the center of variation, and the intensity thereof is made closer to a minimum value as the frequency of the output light approximates to an upper limit and a lower limit. This makes it possible to alleviate the situation in which variation in the frequency of the output light from the light source 2 causes the intensity of the output light to concentrate and to be biased in the vicinity of the upper and lower limits of the frequency. As a result, the side rope of the beat power spectrum can be suppressed and the effective length of a Brillouin dynamic grating can be shortened.

Next, the optical fiber property measuring device 1 having the above-described configuration was used to examine an influence exerted by applying intensity modulation to x-polarized light by the optical intensity modulator 13 in synchronization with the frequency modulation of the light source 2. In this experimental example, part of the polarization maintaining fiber-type optical fiber under test 28 was soaked with cool water. A correlation peak was set in the center, and the length of the fiber soaked with water (hereinafter referred to as length of the soaked fiber) was set to 10 [cm], 40 [cm], 70 [cm], and 100 [cm]. The Brillouin dynamic grating spectrum obtained in each fiber length was examined.

Figure 6A:
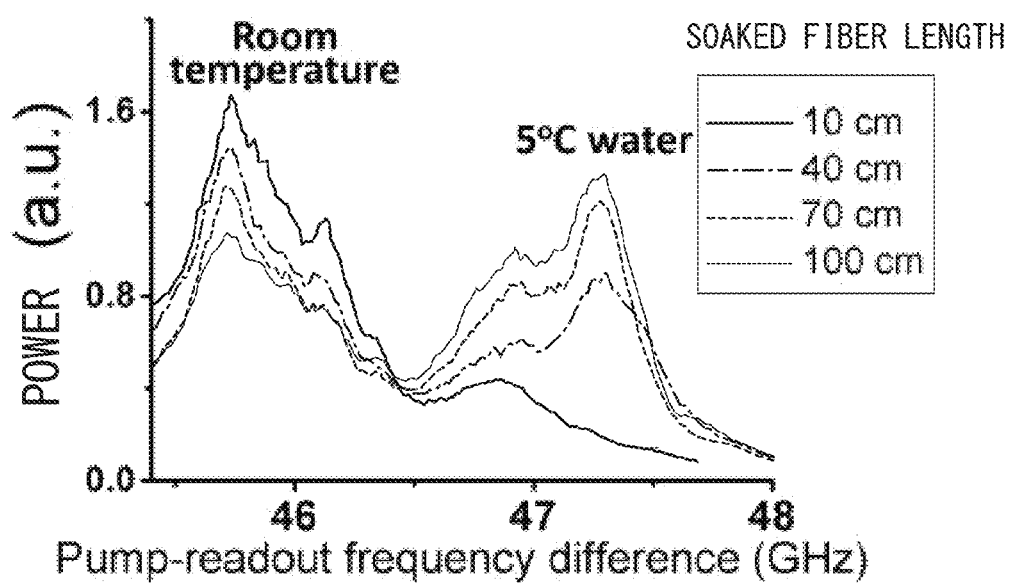
FIG. 6 are graph views illustrating measurement results in each length of soaked fibers with respect to the Brillouin dynamic grating spectrum before and after applying intensity modulation to x-polarized light.

During the examination, the Brillouin dynamic grating spectrum before applying intensity modulation to the x-polarized light by the optical intensity modulator 13 in synchronization with the frequency modulation of the light source 2 was examined. The result thereof was as illustrated in FIG. 6A. The Brillouin dynamic grating spectrum after applying the intensity modulation to x-polarized light by the optical intensity modulator 13 in synchronization with the frequency modulation of the light source 2 was also examined. The result thereof was as illustrated in FIG. 6B.

As illustrated in FIG. 6A, before applying intensity modulation to the x-polarized light in synchronization with the frequency modulation of the light source 2, only the peak corresponding to room temperature (indicated by "Room temperature") could be observed when the length of the soaked fiber was as short as 10 [cm]. Therefore, insufficient spatial resolution could be confirmed. Before applying intensity modulation to the x-polarized light in synchronization with the frequency modulation of the light source 2, the peaks corresponding to both cool water temperature (indicated by "5° C. water") and room temperature were observed even when the length of the soaked fiber was gradually increased up to 100 [cm]. Therefore, insufficient spatial resolution could be confirmed.

Figure 6B:
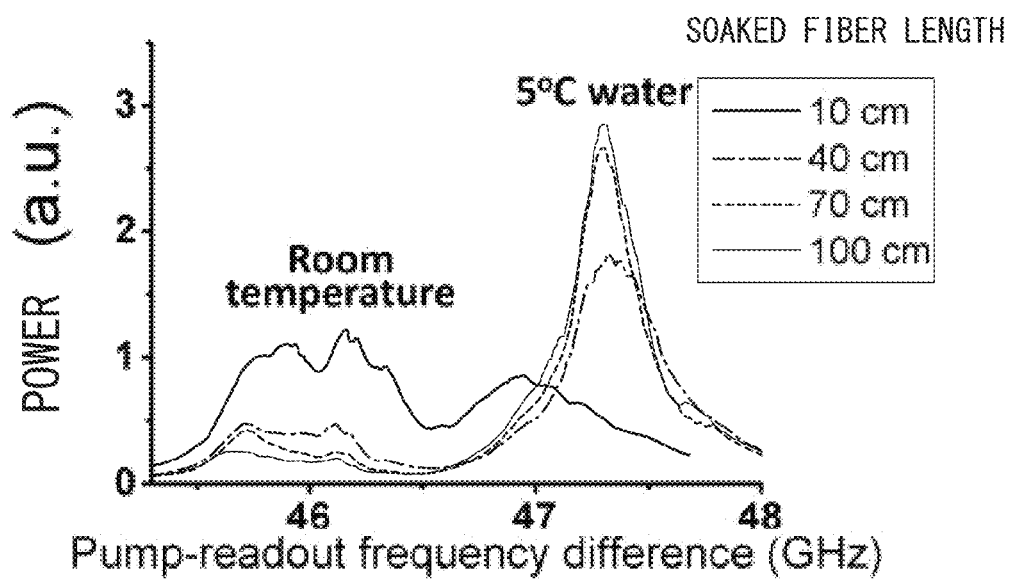

Contrary to this, after applying intensity modulation to the x-polarized light by the optical intensity modulator 13 in synchronization with the frequency modulation of the light source 2, the peaks corresponding to both the cool water temperature and room temperature were observed when the length of the soaked fiber was 10 [cm] as illustrated in FIG. 6B, so that the spatial resolution was insufficient. However, the peak corresponding to cooling water was observed when the length of the soaked fiber length was lengthened, and therefore sufficient spatial resolution could be confirmed.

Figure 7A:
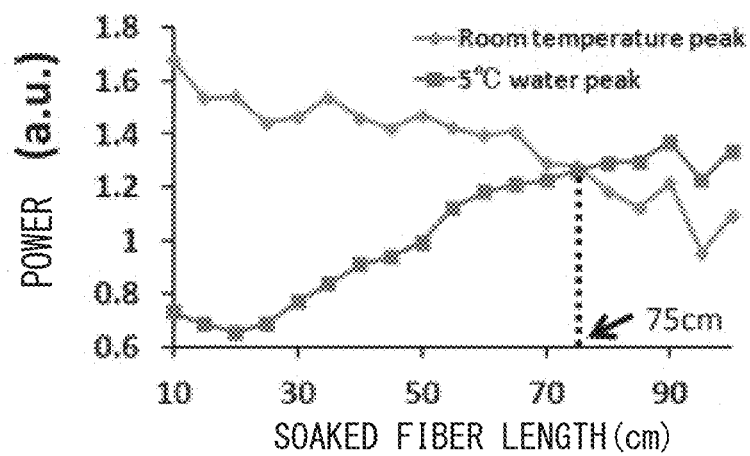
FIG. 7 are graph views illustrating relationship between observed peaks corresponding to cooling water temperature and room temperature and the lengths of soaked fibers.
Figure 7B:
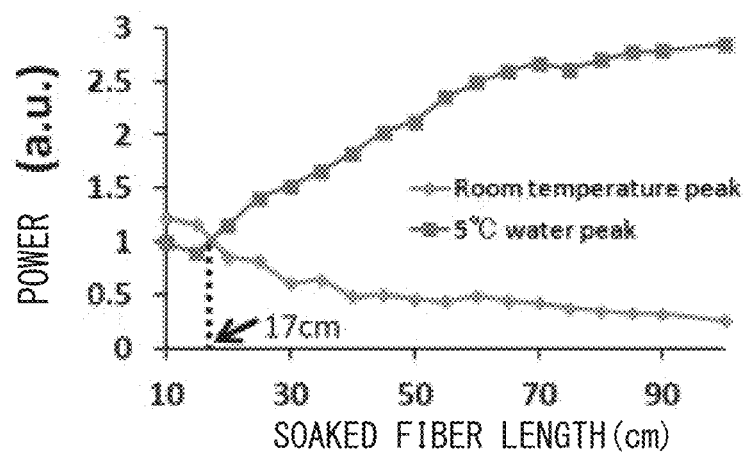

Next, the relationship between the observed peaks corresponding to the cooling water temperature and the room temperature and the soaked fiber length was summarized. The result was as illustrated in FIGS. 7A and 7B. Here, the length of the soaked fiber wherein observed peaks corresponding to the cooling water temperature and the room temperature are identical in intensity was estimated as spatial resolution. As a result, before applying intensity modulation to the x-polarized light in synchronization with the frequency modulation of the light source 2, the spatial resolution was 75 [cm] as illustrated in FIG. 7A. As compared with this, after applying intensity modulation to the x-polarized light in synchronization with the frequency modulation of the light source 2, the spatial resolution improved up to 17 [cm] could be confirmed as illustrated in FIG. 7B.

Figure 8:
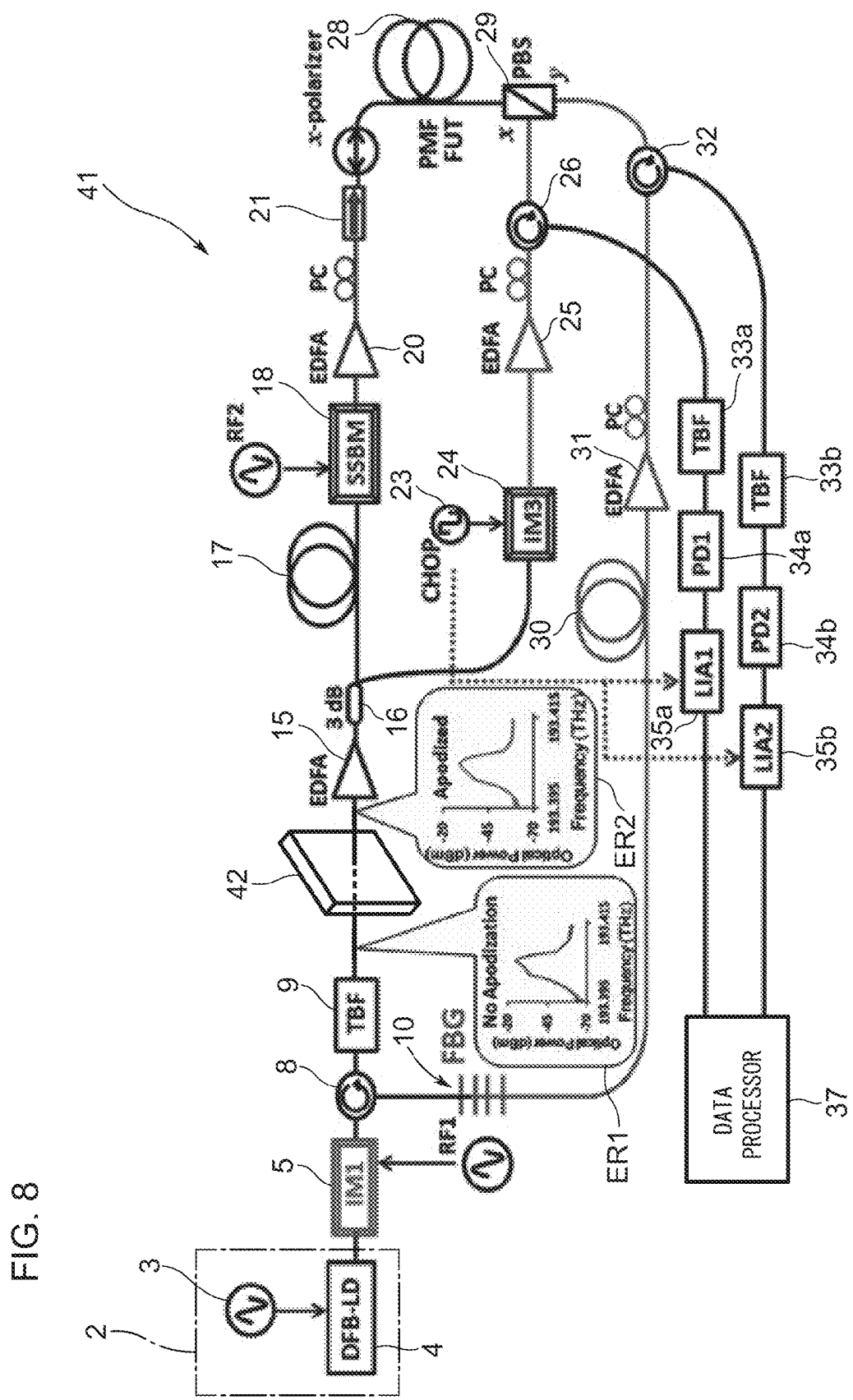
FIG. 8 is a block diagram illustrating the configuration of an optical fiber property measuring device in a second embodiment of the present invention.

FIG. 8 illustrates an optical fiber property measuring device 41 in the second embodiment of the present invention. In FIG. 8, an optical filter 42 having an appropriate transmission spectral characteristic is arranged in place of the optical intensity modulator 13 in the probe light/pump light generating optical path for output light from the light source 2. In this case, the optical filter 42 as an intensity modulation means substantially performs intensity modulation in synchronization with the frequency modulation of the output light from the light source 2, so that the spectrum distribution of the output light can appropriately be adjusted. When the optical filter 42 is used, the filtering characteristic of the optical filter 42 itself enables the intensity of output light to be adjusted in accordance with the frequency of the output light. This makes it extremely easy to suppress the Brillouin dynamic grating generated at the position other than the correlation peak without the necessity of a sync signal from the signal generator 3, and makes it possible to enhance the spatial resolution for acquiring the Brillouin dynamic grating spectrum.

Figure 9:
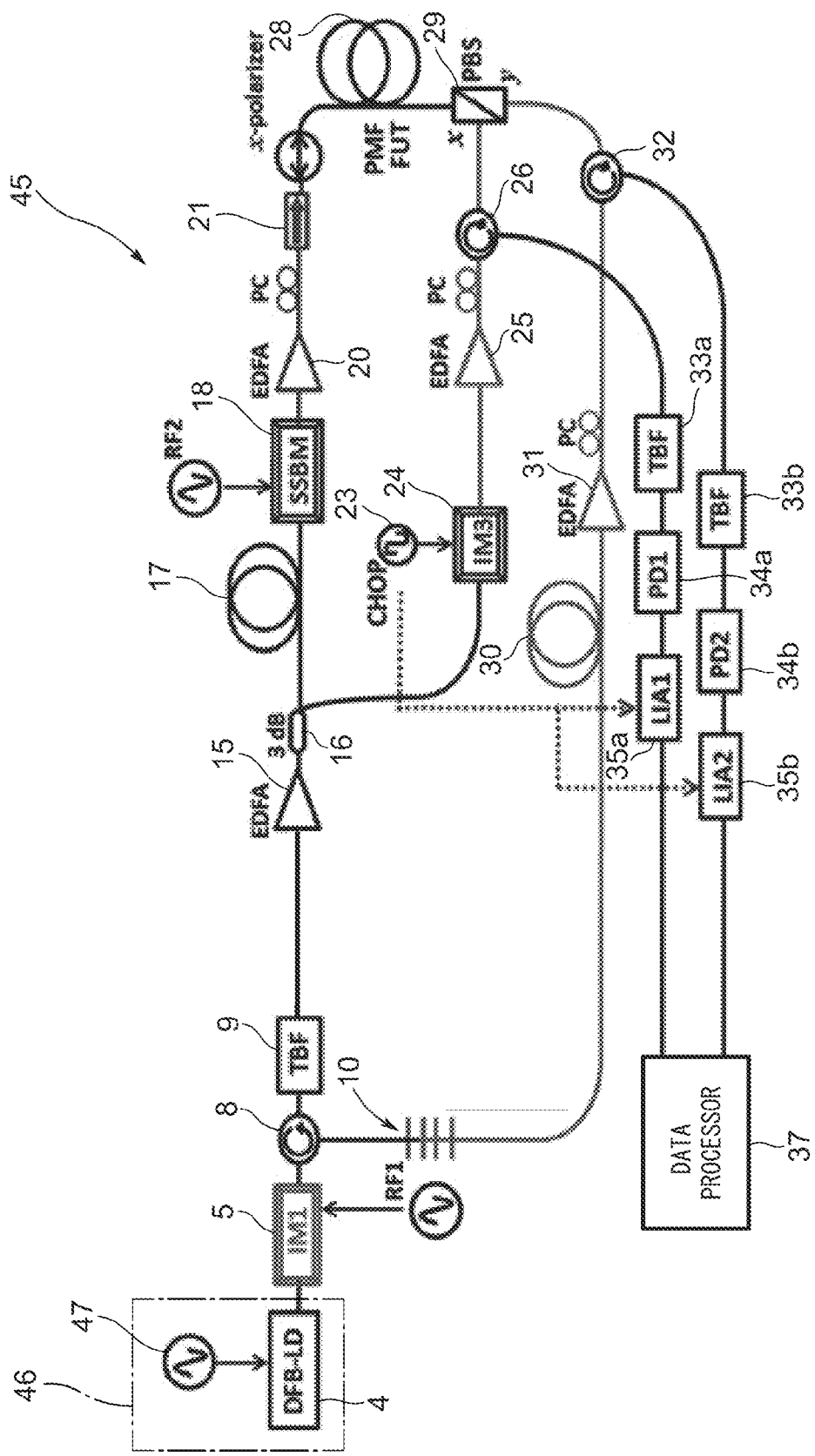
FIG. 9 is a block diagram illustrating the configuration of an optical fiber property measuring device in a third embodiment of the present invention.

In still another configuration of the intensity modulation means, an optical fiber property measuring device 45 may be applied as illustrated in FIG. 9. In the optical fiber property measuring device 45, the optical intensity modulator 13 of external modulation system in the first embodiment is replaced with a signal generator 47 of direct modulation system which modulates the frequency of output light from the light source 46 with a repetitive waveform other than the sinusoidal wave. The signal generator 47 in the optical fiber property measuring device 45 illustrated as the third embodiment has a function of modulating the frequency of the output light from the semiconductor laser 4 with use of a triangular repetitive waveform, for example.

Figure 10A:
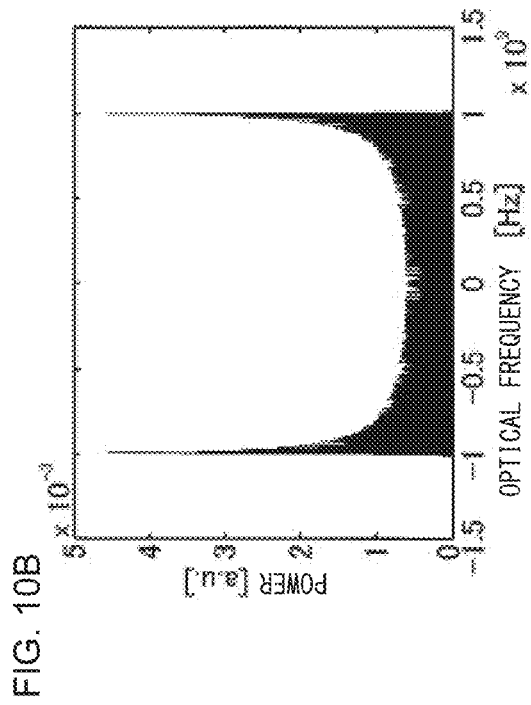
FIG. 10 are graph views each illustrating a frequency modulation waveform and a time average spectrum shape in the case of modulating the frequency of output light with a sinusoidal repetitive waveform and the case of modulating the frequency of output light with a repetitive waveform other than the sinusoidal waveform.
Figure 10B:
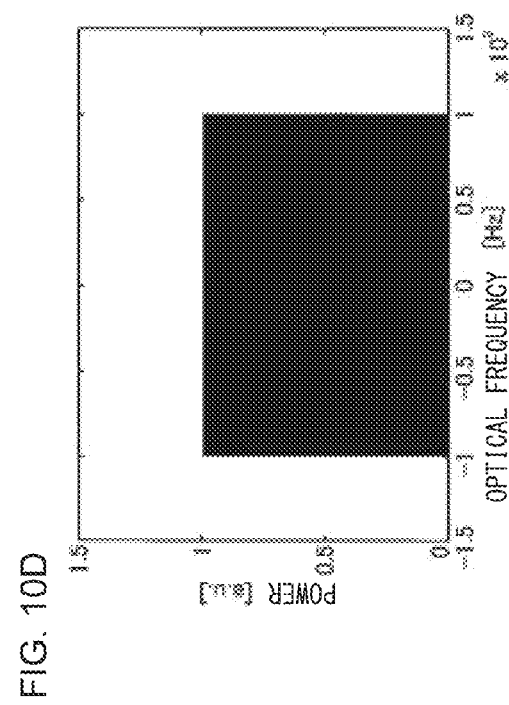

Here, FIGS. 10A to 10D each illustrate a frequency modulation waveform and a time average spectrum shape calculated based on the frequency modulation waveform in the case of modulating the frequency of output light with a sinusoidal repetitive waveform and the case of modulating the frequency of output light with a repetitive waveform other than the sinusoidal waveform. FIG. 10A illustrates a frequency modulation waveform obtained by changing the frequency of output light of the light source 2 into the sinusoidal wave shape. In this case, the waveform stays in the maximum displacement portion of the changing frequency for relatively long time. Accordingly, as illustrated in FIG. 10B, the spectrum intensity (power) has a strong bias on both ends in the vicinity of the upper and lower limits of the frequency.

Figure 10C:
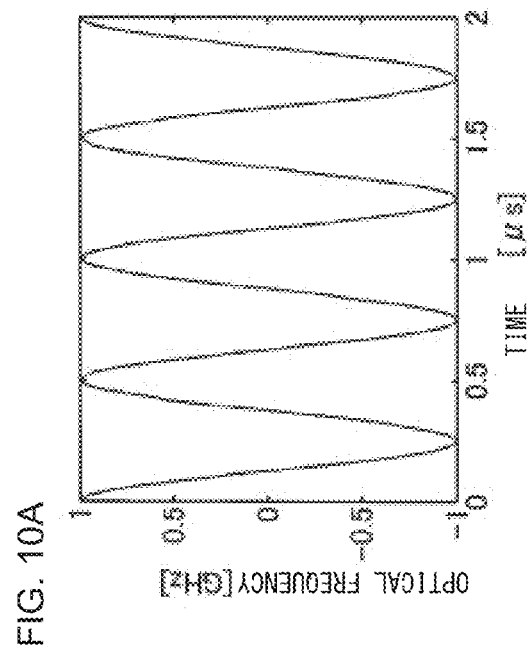
Figure 10D:
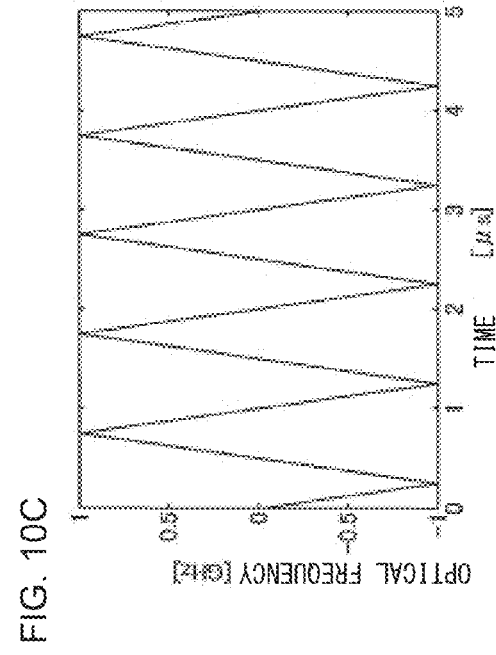

Contrary to this, when the frequency of the output light of the light source 46 is changed with the triangular waveform illustrated in FIG. 10C, the waveform stays in each frequency for the same time period. As a result, a uniform spectrum intensity is obtained as illustrated in FIG. 10D. In the third embodiment, the above-stated intensity modulation means is constituted of a signal generator 47 that modulates the frequency of the light output from the light source 46 with a repetitive waveform other than the sinusoidal waveform. The intensity modulation applied to the output light is implemented by the signal generator 47 that modulates the frequency of the light output from the light source 46 with a repetitive waveform other than the sinusoidal waveform. Thus, the frequency modulation waveform of output light is changed into a waveform other than the sinusoidal wave shape using the signal generator 47. This simple operation makes it extremely easy to suppress the Brillouin dynamic grating generated at the position other than the correlation peak, and makes it possible to enhance the spatial resolution for acquiring the Brillouin dynamic grating spectrum, as in the case of applying intensity modulation to the output light.

The above-stated embodiments have been described in the case of being applied to the optical fiber property measuring device which measures the Brillouin gain spectrum and the reflection spectrum of y-reflected light and measures the distribution of temperature and strain. However, without being limited thereto, the present invention may be applied to an optical fiber property measuring device which measures a birefringence of the polarization maintaining fiber-type optical fiber under test 28. In this optical fiber property measuring device, stimulated Brillouin scattering is generated with x-polarized light in the polarization maintaining fiber-type optical fiber under test 28. However, the Brillouin gain spectrum obtained as a result is not measured and only the Brillouin dynamic grating spectrum is measured. As a result, it becomes possible to measure the birefringence of the polarization maintaining fiber-type optical fiber under test 28. In such an optical fiber property measuring device, the spatial resolution for measuring the birefringence of the polarization maintaining fiber-type optical fiber under test 28 can be enhanced.

In the embodiments disclosed in the foregoing, optical fibers of various configurations may be applied as the optical fiber having a polarization retention property such as the polarization maintaining fiber-type optical fiber under test. For example, optical fibers such as general polarization maintaining optical fibers provided with a substance whose physical stress on the x-polarized plane is different from that on the y-polarized plane, and lead glass optical fibers with a small birefringence, may be applied. In addition to the above, general optical fibers may also be applied if used under the condition that first polarized light and second polarized light do not cross so that the optical fibers gain the polarization retention property.

REFERENCE SIGNS LIST

1, 41, 45 optical fiber property measuring device
2, 46 Light source
13 Optical intensity modulator (intensity modulation means)
28 Polarization maintaining fiber-type optical fiber under test (optical fiber under test)
37 Data processing device (measurement means, Brillouin gain measurement means)
42 Optical filter (intensity modulation means)
47 Signal generator (intensity modulation means)

The invention claimed is:

1. An optical fiber property measuring device, comprising:
a light source that outputs frequency-modulated light;
a first unit comprising a first optical delay device, a single-sideband modulator, a first erbium-doped optical fiber amplifier and an isolator, the first unit shifting a frequency of first polarized light from the light source and making the first polarized light enter from one end of an optical fiber under test as probe light, the optical fiber under test having a polarization retention property;
a second unit comprising a first optical intensity modulator, a second erbium-doped optical fiber amplifier and a first optical branch device, the second unit making the first polarized light from the light source enter from the other end of the optical fiber under test as pump light;
a third unit comprising a wavelength selection reflector, a second optical delay device, a third erbium-doped optical fiber amplifier, and a second optical branch device, the third unit making second polarized light from the light source enter from the other end of the optical fiber under test as readout light; and
a fourth unit comprising a first tuneable bandpass filter, a first photodetector, a first lock in amplifier and a data processor, the fourth unit detecting a reflection spectrum of the readout light and measuring a property of the optical fiber under test, the readout light being reflected by a Brillouin dynamic grating formed by the pump light and the probe light inside the optical fiber under test, wherein
the optical fiber property measuring device includes an intensity modulation part which is one of the following: (i) a second optical intensity modulator, the second optical intensity modulator performing synchronization with a first signal generator in the light source; (ii) an optical filter; and (iii) a second signal generator, the second signal generator modulating the frequency of the light output from the light source with use of a triangular repetitive waveform, and
the intensity modulation part applies intensity modulation to the first polarized light in synchronization with frequency modulation applied to the first polarized light and controls an effective length of the Brillouin dynamic grating formed by the first polarized light so as to adjust a shape of the reflection spectrum of the second polarized light obtained from the reflection with the Brillouin dynamic grating.

2. The optical fiber property measuring device according to claim 1, comprising:
a fifth unit comprising a second tuneable bandpass filter, a second photodetector, a second lock in amplifier and the data processor, the fifth unit detecting a Brillouin gain of the probe light exiting from the optical fiber under test while sweeping a frequency difference between the pump light and the probe light and measuring the property of the optical fiber under test.

3. The optical fiber property measuring device according to claim 1, wherein
the intensity modulation part makes intensity of the light output from the light source closer to a maximum value as the frequency of the output light approximates to a center of variation and makes the intensity closer to a minimum value as the frequency of the output light approximates to an upper limit and a lower limit.

4. An optical fiber property measuring method, comprising:
shifting a frequency of first polarized light from a light source that outputs frequency-modulated light and making the light enter from one end of an optical fiber under test as probe light, the optical fiber under test having a polarization retention property, through a first unit comprising a first optical delay device, a single-sideband modulator, a first erbium-doped optical fiber amplifier and an isolator;

making the first polarized light from the light source enter from the other end of the optical fiber under test as pump light through a second unit comprising a first optical intensity modulator, a second erbium-doped optical fiber amplifier and a first optical branch device;

making frequency-modulated second polarized light from the light source enter from the other end of the optical fiber under test as readout light through a third unit comprising a wavelength selection reflector, a second optical delay device, a third erbium-doped optical fiber amplifier, and a second optical branch device;

detecting a reflection spectrum of the readout light through a fourth unit comprising a first tuneable bandpass filter, a first photodetector, a first lock in amplifier and a data processor, and measuring a property of the optical fiber under test, the readout light being made to exit from the optical fiber under test by a Brillouin dynamic grating formed by the pump light and the probe light inside the optical fiber under test; and applying intensity modulation to the first polarized light by an intensity modulation part in synchronization with frequency modulation of the first polarized light and controlling an effective length of the Brillouin dynamic grating formed by the first polarized light so as to adjust a shape of the reflection spectrum of the second polarized light obtained from the reflection with the Brillouin dynamic grating, in which the intensity modulation part is one of the following: (i) a second optical intensity modulator, the second optical intensity modulator performing synchronization with a first signal generator in the light source; (ii) an optical filter; and (iii) a second signal generator, the second signal generator modulating the frequency of the light output from the light source with use of a triangular repetitive waveform.

5. The optical fiber property measuring method according to claim 4, comprising detecting a Brillouin gain of the probe light exiting from the optical fiber under test while sweeping a frequency difference between the pump light and the probe light by a Brillouin gain measurement unit and measuring the property of the optical fiber under test through a fifth unit comprising a second tuneable bandpass filter, a second photodetector; a second lock in amplifier and the data processor.

6. The optical fiber property measuring method according to claim 4, wherein the intensity modulation applied to the light output from the light source is to make intensity of the output light closer to a maximum value as the frequency of the output light approximates to a center of variation and makes the intensity closer to a minimum value as the frequency of the output light approximates to an upper limit and a lower limit.

* * * * *